[12] United States Patent
Hutchison et al.

(10) Patent No.: US 6,983,461 B2
(45) Date of Patent: Jan. 3, 2006

(54) METHOD AND SYSTEM FOR DEADLOCK DETECTION AND AVOIDANCE

(75) Inventors: Gordon Douglas Hutchison, Eastleigh (GB); Brian David Peacock, North Baddesley (GB)

(73) Assignee: International Business Machines Corporation, Armonk, NY (US)

( * ) Notice: Subject to any disclaimer, the term of this patent is extended or adjusted under 35 U.S.C. 154(b) by 716 days.

(21) Appl. No.: 10/068,337

(22) Filed: Feb. 7, 2002

(65) Prior Publication Data

US 2003/0023656 A1     Jan. 30, 2003

(30) Foreign Application Priority Data

Jul. 27, 2001    (GB)    ................................. 0118294

(51) Int. Cl.
*G06F 9/46*    (2006.01)
(52) U.S. Cl. ...................... 718/104; 718/100; 718/102; 707/8; 710/200
(58) Field of Classification Search ................ 718/100, 718/104, 102, 106, 107; 707/8; 710/200
See application file for complete search history.

(56) References Cited

U.S. PATENT DOCUMENTS

| | | | | |
|---|---|---|---|---|
| 5,182,808 A | * | 1/1993 | Bagnoli et al. | 710/119 |
| 5,317,739 A | * | 5/1994 | Elko et al. | 709/216 |
| 5,377,351 A | * | 12/1994 | Kotera et al. | 707/8 |
| 5,440,743 A | * | 8/1995 | Yokota et al. | 710/200 |
| 5,590,335 A | * | 12/1996 | Dubourreau et al. | 718/104 |
| 5,682,537 A | * | 10/1997 | Davies et al. | 710/200 |
| 5,706,446 A | * | 1/1998 | Kalish et al. | 710/113 |
| 5,706,515 A | * | 1/1998 | Connelly et al. | 718/106 |
| 5,812,824 A | * | 9/1998 | Dearth et al. | 703/14 |
| 5,828,876 A | * | 10/1998 | Fish et al. | 707/1 |
| 5,835,766 A | * | 11/1998 | Iba et al. | 718/104 |
| 5,845,117 A | * | 12/1998 | Fujita | 718/107 |
| 6,009,275 A | * | 12/1999 | DeKoning et al. | 710/220 |
| 6,151,655 A | * | 11/2000 | Jones et al. | 710/244 |
| 6,173,442 B1 | * | 1/2001 | Agesen et al. | 717/141 |
| 6,236,995 B1 | * | 5/2001 | Cummins | 707/8 |
| 6,314,563 B1 | * | 11/2001 | Agesen et al. | 717/108 |
| 6,389,420 B1 | * | 5/2002 | Vahalia et al. | 707/8 |
| 6,389,515 B1 | * | 5/2002 | Schibinger et al. | 711/141 |
| 6,493,826 B1 | * | 12/2002 | Schofield et al. | 713/200 |
| 6,542,891 B1 | * | 4/2003 | Loen et al. | 707/8 |
| 6,597,907 B1 | * | 7/2003 | Pruitt et al. | 455/423 |
| 6,598,068 B1 | * | 7/2003 | Clark | 718/104 |

(Continued)

*Primary Examiner*—Meng-Al T. An
*Assistant Examiner*—Lilian Vo
(74) *Attorney, Agent, or Firm*—Marilyn Smith Dawkins (57) ABSTRACT

The invention relates to a method of operating a computer system supporting multiple processes, and the intention is to avoid deadlock (an example of which is where process A owns resource A, and is waiting on resource B, but resource B is currently owned by process B, which is waiting on resource A). The method commences with receipt of a request from a first process for access to a resource of said computer system. If the requested resource is currently unavailable because it is currently owned by another process, the system examines which processes own or are waiting for other resources on the system, in order to try to detect whether adding the first process to a queue for the requested resource would cause a deadlock situation to arise. If so, the system will typically throw an exception, or possibly return an error to the request for the resource.

18 Claims, 7 Drawing Sheets

U.S. PATENT DOCUMENTS

| | | | |
|---|---|---|---|
| 6,601,120 B1 * | 7/2003 | Schimmel | 710/107 |
| 6,618,744 B1 * | 9/2003 | Simmons et al. | 718/104 |
| 6,622,155 B1 * | 9/2003 | Haddon et al. | 718/100 |
| 6,738,872 B2 * | 5/2004 | Van Huben et al. | 711/150 |
| 6,795,901 B1 * | 9/2004 | Florek et al. | 711/152 |
| 2001/0014905 A1 * | 8/2001 | Onodera | 709/102 |
| 2001/0049714 A1 * | 12/2001 | Kikuchi | 709/201 |
| 2002/0016770 A1 * | 2/2002 | Flenley et al. | 705/43 |
| 2002/0042850 A1 * | 4/2002 | Huras et al. | 709/330 |
| 2002/0184345 A1 * | 12/2002 | Masuyama et al. | 709/220 |
| 2004/0205392 A1 * | 10/2004 | Wu | 714/15 |
| 2004/0268062 A1 * | 12/2004 | Ofer | 711/152 |

* cited by examiner

FIG. 5A $$\begin{array}{c} \underline{TO} \\ \begin{array}{cccccc} & A & B & C & D & E \\ A & \begin{pmatrix} 0 & 0 & 0 & 0 & 0 \\ B & 1 & 0 & 0 & 0 & 0 \\ C & 1 & 1 & 0 & 0 & 0 \\ D & 0 & 1 & 0 & 0 & 0 \\ E & 0 & 1 & 0 & 0 & 0 \end{pmatrix} \end{array} = R \end{array}$$

$$\text{FROM} \quad \begin{array}{cccccc} & A & B & C & D & E \\ A & \begin{pmatrix} 0 & 0 & 0 & 0 & 0 \\ B & 0 & 0 & 0 & 0 & 0 \\ C & 1 & 0 & 0 & 0 & 0 \\ D & 1 & 0 & 0 & 0 & 0 \\ E & 1 & 0 & 0 & 0 & 0 \end{pmatrix} \end{array} = R^2$$

$$\begin{array}{cccccc} & A & B & C & D & E \\ A & \begin{pmatrix} 0 & 0 & 0 & 0 & 0 \\ B & 0 & 0 & 0 & 0 & 0 \\ C & 0 & 0 & 0 & 0 & 0 \\ D & 0 & 0 & 0 & 0 & 0 \\ E & 0 & 0 & 0 & 0 & 0 \end{pmatrix} \end{array} = R^3$$

FIG 5B

FIG. 6A $$\begin{array}{c}\text{TO}\\ \begin{array}{ccccc} A & B & C & D & E \end{array}\\ \begin{array}{c}A\\B\\C\\D\\E\end{array}\begin{pmatrix} 0 & 1 & 0 & 0 & 1 \\ 1 & 0 & 0 & 0 & 0 \\ 1 & 1 & 0 & 0 & 0 \\ 0 & 1 & 0 & 0 & 0 \\ 0 & 1 & 0 & 0 & 0 \end{pmatrix}=R\end{array}$$

FROM $$\begin{array}{ccccc} A & B & C & D & E \end{array}$$
$$\begin{array}{c}A\\B\\C\\D\\E\end{array}\begin{pmatrix} 1 & 1 & 0 & 0 & 0 \\ 0 & 1 & 0 & 0 & 1 \\ 1 & 1 & 0 & 0 & 1 \\ 1 & 0 & 0 & 0 & 0 \\ 1 & 0 & 0 & 0 & 0 \end{pmatrix}=R^2$$

$$\begin{array}{ccccc} A & B & C & D & E \end{array}$$
$$\begin{array}{c}A\\B\\C\\D\\E\end{array}\begin{pmatrix} 1 & 1 & 0 & 0 & 1 \\ 1 & 1 & 0 & 0 & 0 \\ 1 & 2 & 0 & 0 & 1 \\ 0 & 1 & 0 & 0 & 1 \\ 0 & 1 & 0 & 0 & 1 \end{pmatrix}=R^3$$

METHOD AND SYSTEM FOR DEADLOCK DETECTION AND AVOIDANCE

FIELD OF THE INVENTION

The present invention relates generally to a method of detecting and if possible avoiding deadlock in a computer system supporting multiple processes.

BACKGROUND OF THE INVENTION

In the Java programming environment (Java is a trademark of Sun Microsystems Inc), programs are generally run on a virtual machine, rather than directly on hardware. Thus a Java program is typically compiled into byte-code form, and then interpreted by the Java virtual machine (VM) into hardware commands for the platform on which the Java VM is executing. The Java environment is further described in many books, for example "Exploring Java" by Niemeyer and Peck, O'Reilly & Associates, 1996, USA, and "The Java Virtual Machine Specification" by Lindholm and Yellin, Addison-Wedley, 1997, USA.

The Java language supports multiple threads which can run concurrently. As for any concurrent system, it is important to be able to control access to shared resources, to avoid potential conflict between different threads as regards their usage of a particular resource. In the Java language, mutually exclusive access to a shared resource is achieved by means of synchronisation. One of the advantages of the Java language is that this synchronisation is relatively simple for the end-programmer; there is no need at the application level to specifically code lock and unlock operations.

Java VM implementations of synchronisation are generally based on the concept of monitors which can be associated with objects. A monitor can be used for example to exclusively lock a piece of code in an object associated with that monitor, so that only the thread that holds the lock for that object can run that piece of code—other threads will queue waiting for the lock to become free. The monitor can be used to control access to an object representing either a critical section of code or a resource.

Locking in Java is always at the object-level and is achieved by the application applying a "synchronized" statement to those code segments that must run atomically. The statement can be applied either to a whole method, or to a particular block of code within a method. In the former case, when a thread in a first object invokes a synchronised method in a second object, then the thread obtains a lock on that second object. The alternative is to include a synchronised block of code within the method that allows the lock to be held by taking ownership of the lock of an arbitrary object, which is specified in the synchronised command.

The monitor structure in Java can also be used as a communication mechanism between separate threads of execution. This is achieved by a first thread including a "wait" command within synchronised code. This suspends execution of this first thread, and effectively allows another thread to obtain the lock controlling access to this synchronised code. Corresponding to the "wait" command is a "notify" command in synchronised code controlled by the same object lock. On execution of this "notify" command by a second thread, the first thread is resumed, although it will have to wait for access to the lock until this is released by the second thread. Thus when used for this purpose a thread may wait on an object (or event) and another thread can notify the waiter. The "notify" command actually comes in two flavours: a "notify-all", whereby all the threads waiting on the object are notified, and a simple "notify", whereby only one (arbitrary) waiting thread is notified.

Although the ability to support concurrent threads greatly increases the power and flexibility of Java programs, it does create a pitfall, commonly termed "deadlock". This is the situation where one thread (thread A), which owns resource X on a mutually exclusive basis, wants to access another resource Y that is currently owned by a second thread (thread B), also on a mutually exclusive basis. Thus thread A waits for thread B to release Y. However, it is possible that thread B must acquire resource X before it can release resource Y. Since resource X is currently owned by thread A, thread B must also wait. Unfortunately we are now in a situation where thread A cannot progress until thread B releases resource Y, whilst thread B cannot progress until thread A releases resource X. The result is that neither thread is able to progress, and we have reached a deadlock in which the system is locked, unable to progress (i.e. it has effectively crashed).

Note that although the above example includes only two threads, a more complex cyclic dependency can also produce deadlock. For example, thread A waiting on thread B, thread B waiting on thread C, thread C waiting on thread D, and thread D waiting on thread A (where waiting on a thread here implies waiting for a thread to release a particular resource that it currently owns).

The problem of deadlock is well-known in the literature, both in Java and also in other languages, see for example: "Java Deadlock", by Vermeulen, p52, 54–56, 88–89, in Dr Dobbs Journal, Vol 22/Sep. 9, 1997. It is theoretically possible to avoid deadlock by better program design, and some prior art has focused on how best to achieve this—e.g.: "Modelling Multi-Threading in Java" by Wabenhorst and Potter, p 153–164 in IEEE Proceedings of the Conference: Technology of Object Oriented Languages and Systems (TOOLS 25), Australia, November 1997. A somewhat different approach is described in "Modelling and Validation of Java Multithreading Applications using SPIN" by Dematini, Iosif, and Sisto, p577–603 in Software—Practice and Experience, v 29/7, July 1999, Wiley. Here, program source code is translated into a formal description file, which can then be analysed to find potential deadlocks. However, this approach adds another level of complexity, and it is not clear if it is 100% effective. Modelling to avoid deadlock is also discussed in: "A CSP model for Java multithreading" by Welch and Martin, p 114–122 in IEEE Proceedings of the International Symposium on Software Engineering for Parallel and Distributed systems, June 2000, Ireland.

Despite the above work, deadlock remains a common pitfall for concurrent systems in practice, and eliminating deadlock retrospectively from applications can require significant time and effort. One can classify deadlock situations into two different types. The first is where deadlock arises inevitably as the result of the application logic. This type is relatively easy to detect using the formal tools described above. The second is where the deadlock is essentially accidental, and derives from precise timing considerations of operations in one thread in relation to another thread. This sort of situation is inherently non-deterministic, and may vary from one incarnation of the application to another; in other words, a given application may only lock on certain occasions, and it may be difficult to reproduce this problem for subsequent investigation.

The prior art further discloses various tools available to support analysis work after deadlock has occurred, such as the Probe Thread analyzer (the Probe tool is available from Sitar Software, see in particular the site /software/jprobe/ jprobethreadalyzer.html at www.sitraka.com). Although such tools are useful in a development context, they do not generally allow for real-time avoidance of deadlock. This is discussed elsewhere in the literature, for example in: "Dynamic Instrumentation of Threaded Applications" by Xu, Miller and Naim, p 49–59, in Proceedings of the Seventh ACM SIGPLAN symposium on Principles and Practice of Parallel Programming, May 1999, Atlanta, USA. This article describes a mechanism for adding instrumentation (i.e. diagnostic facilities) to individual threads. This raises the problem that the instrumentation may require a lock owned by its corresponding thread, resulting in a form of self-deadlock. This situation is obviated by making locks provide information about current lock owner. The instrumentation is then skipped if this owner is the same as the corresponding thread for the instrumentation, thereby avoiding the deadlock. This technique is only appropriate to self-deadlock in situations involving instrumentation, and cannot be easily generalised to broader application deadlock problems.

"Deadlock Detection and Resolution for Discrete Event Simulation: Multiple-Unit Seizes" by Venkatesh, Smith, Deuemeyer and Curry, p 201–16, in IIE Trans Vol 30/3, March 1998, Chapman & Hall, discusses deadlocks generally in the context of simulation and manufacturing systems, and briefly mentions some deadlock avoidance strategies. These seem to be based primarily on defining required resources, and trying to predict if future use will lead to deadlock. It is not clear if this technique is practicable outside the context of simulation.

"Extending Java to Support Shared Resource Protection and Deadlock Detection in Threads Programming" by Van Engen, Bradshaw, and Oostendorp, ACM Crossroads, v 4.2, Winter 1997 (electronic publication) interposes a program that effectively sits between the application and the Java VM, and extends the basic Java object to provide the facility for deadlock detection. Thus if a thread requests an object that would lead to a deadlock, this is detected by looking for a cyclic pattern of dependencies, and an exception can be thrown back to the application.

Unfortunately, this deadlock detection can only be utilised with applications that have been specifically designed for resource control. This places severe limitations on the freedom of the application designer, due to the single inheritance model of Java, so that all application objects can only be extensions of the resource control set. In addition, the technique cannot be used with existing applications that have not been written for the resource control layer. Furthermore, it is not desirable to modify applications to work with this layer, because the extra overhead involved in this approach at run-time is very considerable, thereby giving markedly reduced performance.

SUMMARY OF THE INVENTION

Accordingly, the present invention provides a method of operating a computer system supporting multiple processes as defined in the appended claims. In one preferred embodiment, the method includes providing a set of monitors for controlling access to resources of the computer system, whereby a process has to enter a monitor in order to access a corresponding resource, and has to join an entry queue for the monitor if the resource is currently owned by another process. Responsive to a predetermined condition, processes queued on monitors are examined to determine whether there is a deadlock situation; if such a deadlock is found, information can then be returned indicating the identity of the processes and monitors involved in the deadlock. It will be appreciated that methods for performing deadlock analysis per se, based on which processes are waiting (queuing) for other processes, are well-known in the art (one preferred implementation is described in detail below).

Note that in the context of the present invention, a process represents any strand of execution, whether formally a process, a thread, or such-like. The computer system supports multiple processes which can operate in parallel (either logically via time-slicing or truly parallel on a multi-processor system)—hence the need for monitors to control contended access to resources. Moreover, the above approach is not limited to a single system, but may be extended across a set of machines (a distributed system) by allowing the examination of processes queued on monitors to take into account the state of monitors on one or more remote machines.

In one preferred embodiment, the predetermined condition that triggers examination for deadlock comprises a process requesting to enter a monitor that is currently owned by another process (i.e. contended access), since it is such a situation that may give rise to deadlock. This detection of deadlock at the point at which it is created gives most flexibility in terms of backout strategies, as discussed below, and also minimises time wasted actually in deadlock.

Two alternative implementations are disclosed herein for this form of deadlock detection. In the first, the system maintains a global table of contended monitors (a monitor is contended if there is a process in its entry queue). The table identifies processes which own or are queued on contended monitors, and so is updated each time a process enters, attempts to enter, or exits a contended monitor. The information stored in the table allows cyclic dependencies to be detected upon creation, which are what cause deadlock.

In the alternative implementation, the necessary data for a deadlock analysis is created afresh at each attempt to enter a contended monitor, but only for those processes which might be possibly involved in deadlock. These are identified on an iterative basis, by first looking at those processes queued on (or owning) the requested monitor. Next monitors owned or waiting to be owned by these processes are identified. We now loop back and look at processes queued on this set of monitors, and then cycle through identifying monitors and processes in turn, until no new ones are included. This provides the complete set of processes that have a dependency directly or indirectly involving the process that is requesting the monitor, and allows any potential new deadlock to be detected.

It will be appreciated that which of these two implementations works best, the global table or the iterative identification per monitor, will depend on the type of application. For example, having a large number of threads, but with relatively little interaction, favours the iterative process, since the table would represent considerable overhead.

It will also be recognised that irrespective of the implementation adopted, the approach of performing real-time deadlock analysis at each contended monitor request will impact overall system performance, and may indeed affect whether deadlock occurs in the first place. Therefore a rather different strategy is adopted in another preferred embodiment, in which the predetermined condition comprises the detection that a set of processes have not progressed over a certain interval. Thus the only overhead here is a process that periodically examines the program counter of other processes on the system, say once every second. If the program counters of a set of processes have not advanced between one check and another, then this suggests that deadlock has occurrred. This can be confirmed by an analysis for deadlock of monitors and processes (the processes potentially involved can be identified on an iterative basis as described above, taking the set of stalled processes as the first step in the iteration). Note that the deadlock analysis may be preceded by an optional check that the stalled processes are all waiting to acquire a resource (enter a monitor), otherwise there must be some different reason for the standstill apart from deadlock.

It will be appreciated that the advantage of performing the full deadlock analysis only if the system has effectively already stopped, rather than for each contended monitor request, is that there is minimum adverse impact on normal running of the application. The only drawback is that it may not be possible to identify which monitor request in the cycle finally triggered the deadlock (this will depend on how much information the system retains about the various processes), so that diagnostic output and backout options may be slightly more limited.

If the analysis of the processes and monitors does reveal that deadlock has occurred, either following a contended request for a monitor or detection of (partial) system standstill, there are various options available for returning the information about the identity of the processes and monitors involved in the deadlock. One possibility is for the system to produce an error (including or pointing to the relevant information) that will typically terminate the operation of the system. It will be appreciated that this immediate termination is preferable to the prior art situation, where the deadlock would persist indefinitely until explicit user intervention to kill the system.

An alternative approach is for the system to generate an exception rather than an error, which is passed to the application for handling. The exception includes information about the identity of the processes and monitors involved in the deadlock, which can then be used by the application to try to break the deadlock, typically by having processes release monitors which they currently own but are not actually using. This exception can be returned to just the requesting process (ie. the one whose request for a monitor triggered the deadlock), if this is known, or to all processes involved in the deadlock. It will be appreciated that it is relatively straightforward for any process in a monitor entry queue to be backed out of this queue, since the process will not have proceeded since entering the queue. Note that if the application does not know how to handle such an exception, then the application will simply ignore the exception and proceed into the deadlock situation, as in the prior art.

One complication is that monitors in a Java environment can, as described above, be used for the dual purposes of enforcing exclusive access, and also for a conditional wait operation. Since both of these involve a timing dependency of one process (thread) on another, they can both lead to potential deadlock. Therefore, in the preferred embodiment, the examination of processes queued on monitors to determine whether there is a deadlock situation includes examining processes having a conditional wait on a monitor. Note however that it is not generally feasible to automatically detect all deadlock situations involving conditional waits because resolution of any particular wait (i.e. notification) depends on an unknown (to the system) process, which indeed may not even have yet started.

The invention further provides a computing system supporting multiple processes, and including:

a set of monitors for controlling access to resources of the computer system, whereby a process has to enter a monitor in order to access a corresponding resource, and has to join an entry queue for the monitor if the resource is currently owned by another process;

means responsive to a predetermined condition for examining processes queued on monitors to determine whether there is a deadlock situation; and means responsive to such deadlock being found for returning information about the identity of the processes and monitors involved in the deadlock.

It will be appreciated that such a computer system need not be implemented as a conventional computer, but could represent an embedded processing system in a very wide range of potentially intelligent devices, from telephone to aeroplane, and from microwave to automobile.

The invention further provides a computer program product comprising instructions encoded on a computer readable medium for causing a computer to perform the methods described above. A suitable computer readable medium may be a DVD or computer disk, or the instructions may be loaded into memory (e.g. RAM) of a computer system, for execution by a processor to implement the relevant methods. It will be appreciated that the computer system and program product of the invention will generally benefit from the same preferred features as the method of the invention.

BRIEF DESCRIPTION OF THE DRAWINGS

A preferred embodiment of the invention will now be described in detail by way of example only with reference to the following drawings.

Figure 1:
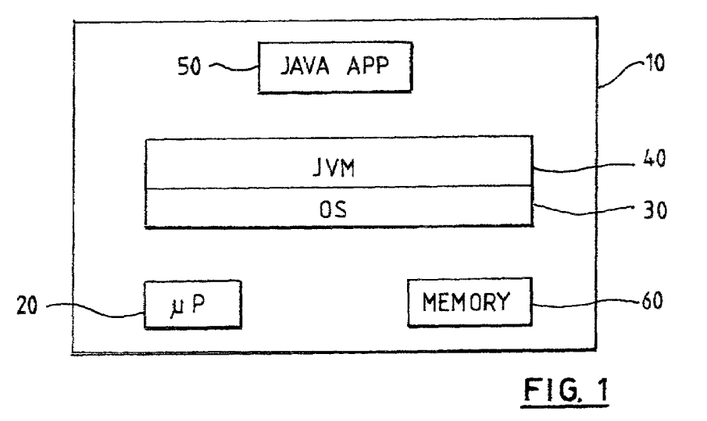
FIG. 1 is a schematic drawing of a computer system supporting a Java virtual machine (VM)

FIG. 1 illustrates a computer system 10 including a (micro)processor 20 which is used to run software loaded into memory 60. The software can be loaded into the memory by various means (not shown), for example from a removable storage device such as a floppy disc or CD ROM, or over a network such as a local area network (LAN) or telephone/modem (wired or wireless) connection, typically via a hard disk drive (also not shown). Computer system 10 runs an operating system (OS) 30, on top of which is provided a Java virtual machine (VM) 40. The Java VM 40 looks like an application to the (native) OS 30, but in fact functions itself as a virtual operating system, supporting Java application 50.

It will be appreciated that computer system 10 can be a standard personal computer or workstation, minicomputer, mainframe, palmtop, or any other suitable computing device, and will typically include many other components (not shown) such as display screen, keyboard, sound card, network adapter card, etc. which are not directly relevant to an understanding of the present invention. Note that computer system 10 may also be an embedded system, such as a set top box, or any other hardware device including a processor 20 and control software 30, 40, and indeed, the advantages of the present invention may be of particular benefit in this domain.

Figure 2:
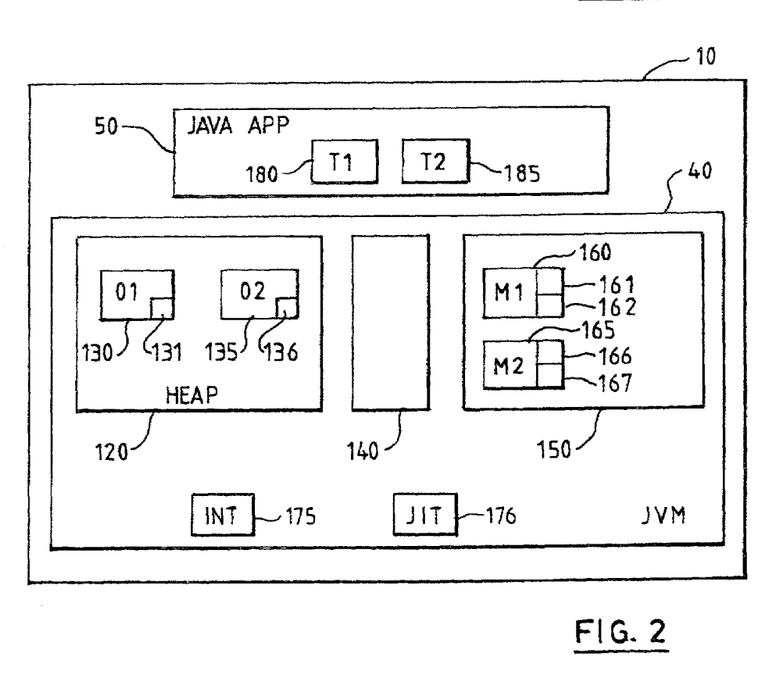
FIG. 2 is a schematic diagram showing the Java VM in more detail.

FIG. 2 shows the Java VM 40 and Java application 50 in more detail. Thus Java application 50 includes multiple threads, T1 180 and T2 185. These threads are run in parallel by Java VM 40, thereby giving rise to possible contention for resources between T1 and T2. Such contention can even arise when Java application 50 is single-threaded, because some of the Java VM which runs Java application 50 is itself written in Java and contains multiple threads.

Looking now at the Java VM 40, this includes a heap 120 which is used for storing multiple objects, O1 130 and O2 135. There is also a pool 150 of monitors, including monitors M1 160 and M2 165. Within each monitor are data fields 161, 162, and 166, 167 respectively whose purpose will be described in more detail below. Hash table 140 can be used to ascertain the monitor corresponding to a particular object id. It will be appreciated that the monitors are typically based on an underlying implementation provided by the OS 30.

The Java VM 40 further includes interpreter 175. This is the component that takes the byte-code for application 50, and then converts the byte-code into the corresponding instructions to send to processor 20 for execution. Java VM 40 also has a Just-in-Time (JIT) compiler 176, which compiles frequently used byte-code into a form that can be sent directly to processor 20. Once code has been compiled by JIT 176, it no longer has to be interpreted (i.e. converted into the appropriate machine instructions). This means that interpreter 175 can effectively be by-passed, thereby speeding up processing.

It will be appreciated of course that FIG. 2 is simplified, and essentially shows only those components pertinent to an understanding of the present invention. Thus for example the heap may contain thousands of Java objects in order to run Java application 50, and the Java VM 40 contains many other components (not shown) such as class loaders, stack etc.

Figure 3:
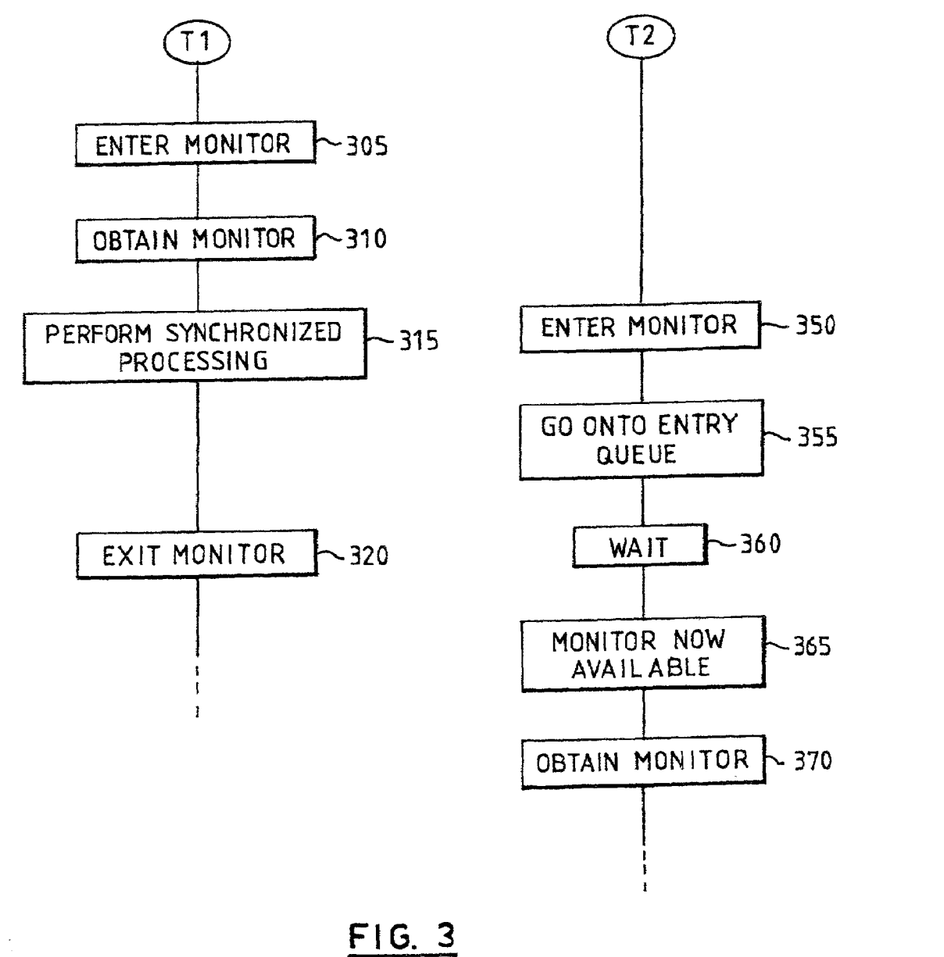
FIG. 3 is a flowchart showing two threads obtaining synchronised access to a monitor.

FIG. 3 is a flowchart showing standard monitor operation for a synchronised statement in Java. This statement is used to control contention between two threads T1, T2 for a resource for which concurrent access is not permitted. Thus the synchronised code utilises the monitor to act as a mutex, so that only a single thread can access the resource at a time.

The system actually supports four different operations on a monitor: Enter, Exit, Wait and Notify. Enter and Exit are used to determine ownership of the underlying mutex associated with the monitor. As previously mentioned, they are not coded directly into the application, but rather utilised by the Java VM code to implement synchronisation. Wait and Notify are used to perform the Wait-Notify construct in Java and will be discussed below in relation to FIG. 4. Note that the Java language further supports a Notify-All operation as described above; this can be regarded as a special case of Notify.

Looking now at the method of FIG. 3, T1 initially encounters the synchronised method or block of code, and tries to obtain the monitor associated with that code. This involves issuing an enter command on the monitor, step 305. Since the monitor is assumed to be currently available, this is followed by T1 successfully obtaining the monitor, step 310. Thread T1 now performs the relevant synchronised code, step 315, and can use whatever resource is protected by the monitor. Meanwhile, thread T2 also encounters a synchronised method of block of code associated with the same monitor. However, when it tries to enter the monitor, step 350, it fails to obtain the monitor, since it is already owned by thread T1. Instead, in step 355 it is placed on an entry queue associated with that monitor (shown schematically as block 161 for M1 and 166 for M2 in FIG. 2), and has to wait in this queue, step 360, until T1 releases the monitor.

Subsequently thread T1 finishes its synchronised processing, and so exits the monitor, step 320. At this point, it is detected that the entry queue for this monitor contains T2, and so thread T2 is informed that the monitor has been released, step 365. Accordingly, thread T2 is now able to resume and enter the monitor successfully, thereby obtaining ownership of the monitor, step 370. T2 then proceeds to perform its own synchronised processing, including access to the protected resource (not shown in FIG. 2).

Figure 4:
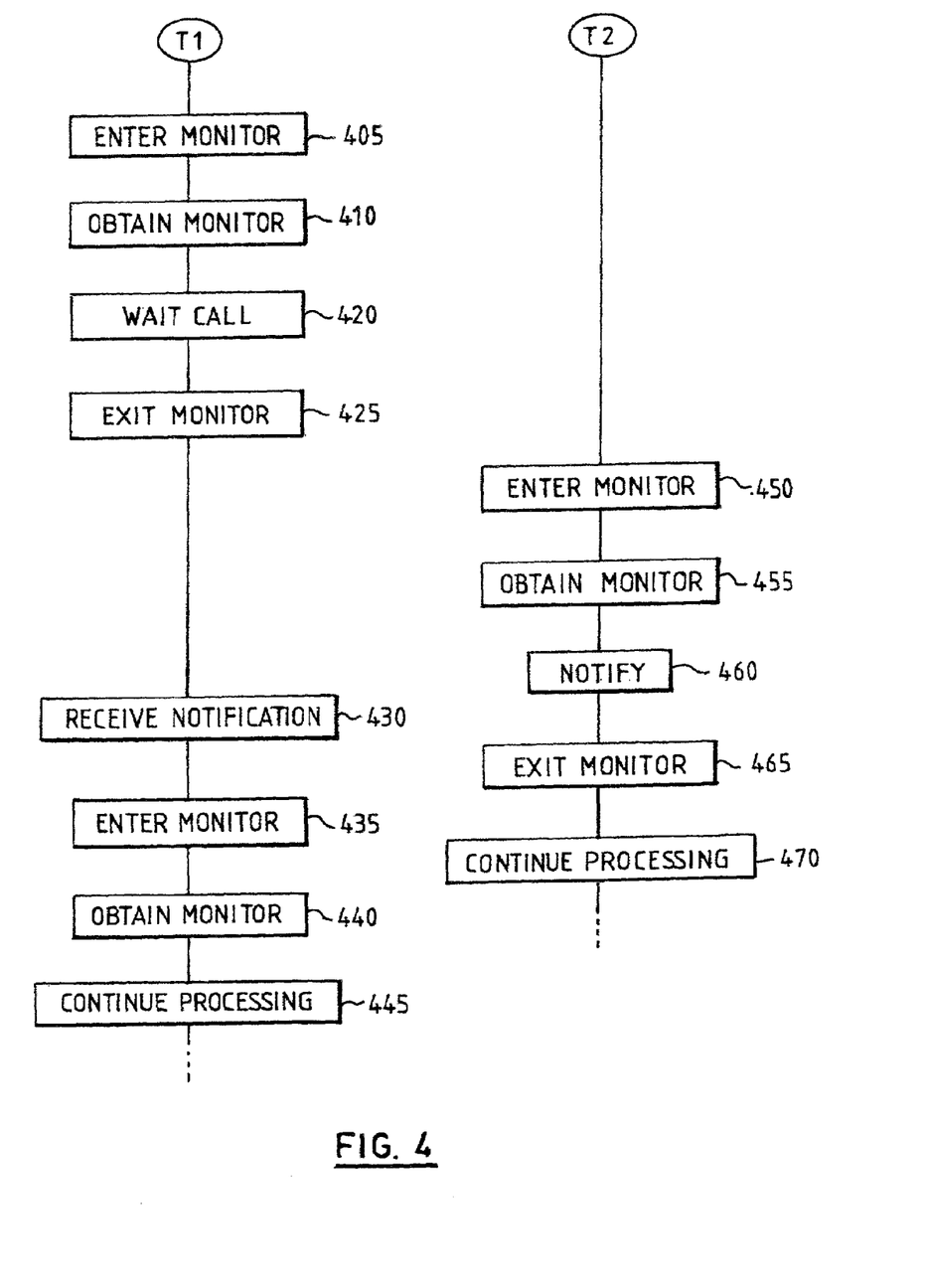
FIG. 4 is a flowchart showing two threads using a wait-notify construction.

FIG. 4 illustrates a somewhat different form of synchronisation in Java, whereby a monitor is not used as a mutex to control access to a resource, but rather as a mechanism to control the relative timing of two threads T1 and T2. As shown in FIG. 4, T1 first enters the monitor (step 405), which is assumed to be available, and so successfully obtains ownership of the monitor (step 410). Thread T1 now issues a wait call (step 420). This has the effect of suspending T1, and placing T1 on a wait queue for the monitor (shown schematically as block 162, 167 in M1 and M2 respectively in FIG. 2). Thread T1 now exits the monitor (step 425).

A second thread T2 now comes along and enters the monitor (step 450). Since the monitor has been released by T1, T2 can successfully obtain ownership of the monitor (step 455). Thread T2 now issues a notify command (step 460), the purpose of which is to resume the waiting thread T1. Having issued the notify command, thread T2 now exits the monitor (step 465), and continues with other processing (step 470). Meanwhile, thread T1 receives the notification (step 430) from T2, and tries to enter the monitor (step 435). Assuming that T2 has by now exited the monitor, T1 will then successfully obtain the monitor (step 440) and can then continue processing (step 445).

It will be appreciated that the events shown in FIG. 4 represent a relatively simple case, with only two threads involved, but more complicated scenarios are possible. For example a third thread may acquire the monitor after it is initially released by thread T1 at step 425, for purposes unrelated to the synchronisation of T1 (e.g. to ensure exclusive access to a particular resource associated with the monitor). In this case T2 will not be able to successfully obtain the monitor (step 455) until it is released by the third thread. In other words, T2 will have to queue to enter the monitor, as depicted in FIG. 3.

Another possibility is that this third thread suspends itself, like T1, and that T2 then issues a notify-all command. In this case both T1 and the third thread will receive notification from T2 (step 430), but only one of them will be able to successfully obtain ownership of the monitor (step 440)—the other will have to queue to enter the monitor, again as depicted in FIG. 3.

It will also be appreciated that some of the processing shown in FIG. 4 occurs transparently to the thread at the application level. Thus at an application level, the wait call of T1 (step 420) is followed by the notify call from T2 (step 460), and the resumed processing of T1 at step 445. In other words, the application is unaware that in the meantime it has actually released the monitor, to allow T2 to obtain it, and then subsequently reacquired it (potentially following a delay for contention as suggested above if a third thread intervenes); rather these operations are all performed by the Java VM, effectively under the covers.

Now a potential deadlock situation occurs whenever a thread tries unsuccessfully to enter a monitor, since at this point the thread cannot proceed any further until the monitor is released by its current owner (this corresponds to step 355 in FIG. 3, with the thread going onto the entry queue 161, 166). To illustrate this, consider three monitors, M1, M2, and M3, and threads A, B, C, D and E. The queue for each monitor is as follows:

M1: A, B, C
M2: B, D
M3: B, E

In each case the first entry in the queue is the current owner of the monitor. Note that at any given time, a thread can only be waiting to enter one monitor, but can own any number. In other words, a thread can appear multiple times as the first entry in the above listings, but only once lower down the queue.

Figure 5A:
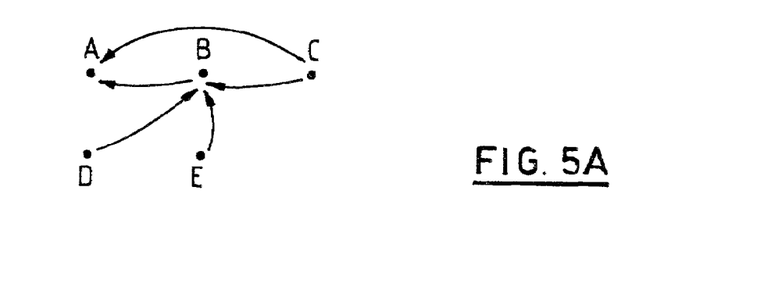
FIG. 5A is a graph illustrating thread waiting relationships.

We can derive a set of relationships between threads from the above monitor queues as follows:

M1: B waits on A; C waits on A, C waits on B
M2: D waits on B
M3: E waits on B In other words, each thread is waiting on those higher up the entry queue. FIG. 5A is a graphical representation of these relationships, where the nodes represent threads and the directed arcs (arrows) indicate "is waiting for".

Deadlock has occurred if there are any cyclic relationships, in other words, if starting from any thread (i.e. letter), we can follow the arrows and return to the original thread. From FIG. 5A we can see that there are no cyclic relationships, and accordingly the above set of queues cannot cause deadlock.

Figure 5B:
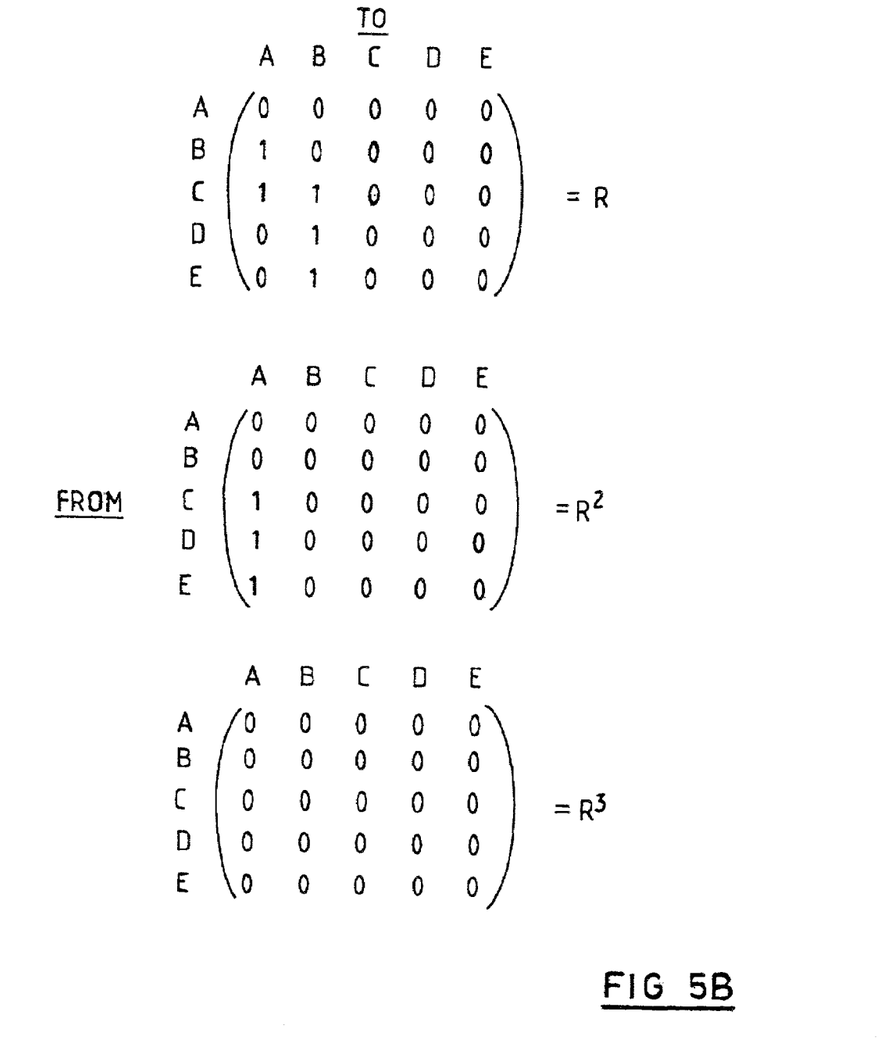
FIG. 5B is a matrix representation of the graph of FIG. 5A.

We can investigate this mathematically by constructing a node-arc matrix, as shown in FIG. 5B. If the rows indicate From (F), and the columns To (T), and using 1 to indicate a path (i.e. waiting relationship) between the relevant threads, and 0 to indicate that there is no such path, then the matrix of FIG. 5B, denoted R, corresponds to the graph of FIG. 5A. As is well-known if we calculate higher powers of R, then these correspond to paths containing more than one step. Thus $R^2$ is the number of two-step paths between the relevant threads, $R^3$ the number of three-step paths, and so on. FIG. 5B also illustrates the value of $R^2$ and $R^3$. This indicates that there is one two-stage path from C to A, one two-stage path from D to A, and one two-stage path from E to A (all via B).

Any cyclic path is indicated by a non-zero number in the primary diagonal, from top left to bottom right, since this represents a route from a node back to itself. This diagonal is zero for R, indicating no cyclic one-stage paths (i.e. from a letter looping back to itself); this is because obviously a thread cannot wait for itself. If we now look at $R^2$, then again the primary diagonal is all zero, indicating no two-stage cyclic paths. To investigate the possibility for longer cyclic paths, we look at the primary diagonal of higher powers of R. Note that if we have N nodes (N=5 in the example of FIG. 5), then we need only examine the first N powers of R (i.e. up to $R^5$). This is because any routes involving more than N steps must involve a cyclic path of less than N steps, since at least one node must be visited more than once. In the example of FIG. 5, $R^3$ is completely zero, and higher powers of R must therefore necessarily be zero also. Thus the matrices of FIG. 5B confirm that R and its powers contain no elements on the primary diagonal, and hence the graph of FIG. 5A is acyclic—i.e. contains no cyclic dependencies. Consequently, the configuration of waiting threads on monitors M1, M2, and M3 is safe from any deadlock problems.

Figure 6A:
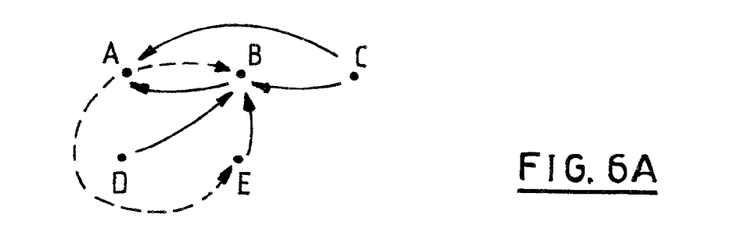
FIG. 6A is a graph illustrating thread waiting relationships, based on FIG. 5A but with the addition of extra relationships.
Figure 6B:
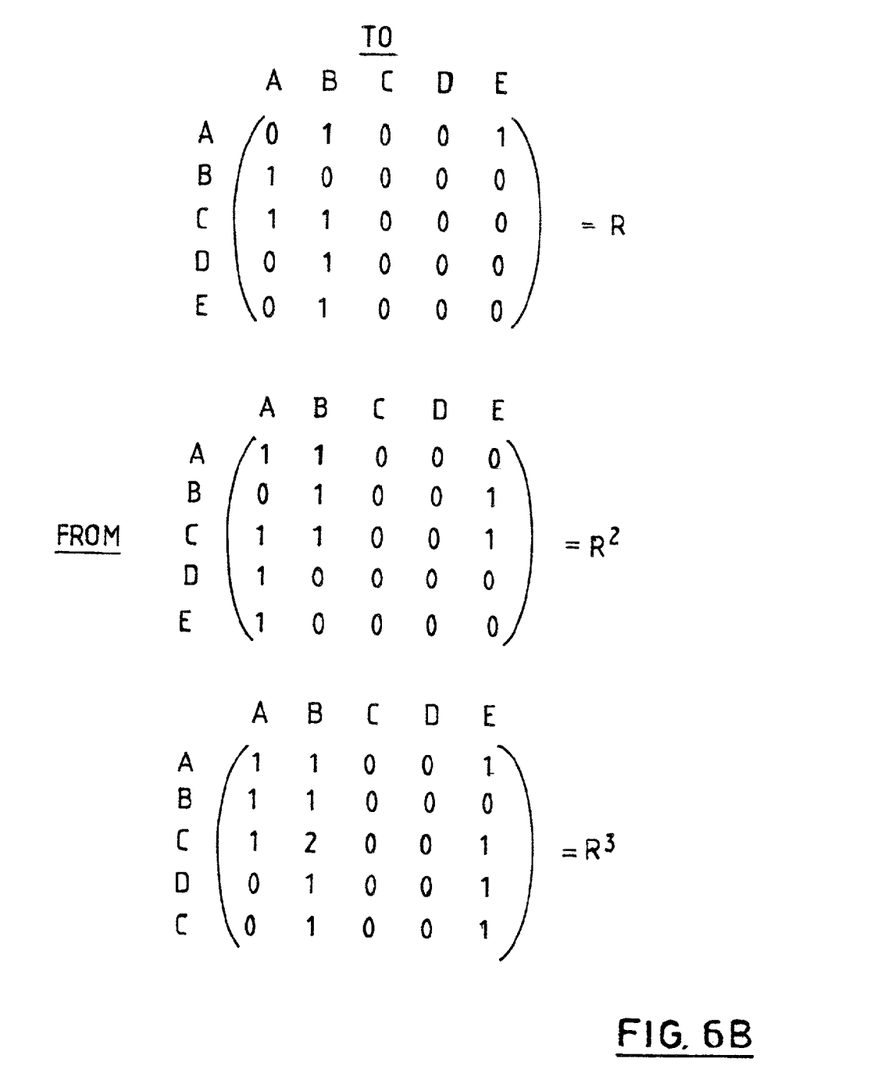
FIG. 6B is a matrix representation of the graph of FIG. 6A.

FIG. 6 illustrates the situation where a new thread, thread A, is added to the entry queue of M3. Thus the dependencies of FIG. 5 are supplemented by two new dependencies, namely thread A waiting on B and E. These two new dependencies are indicated by a dashed line in FIG. 6A, and in FIG. 6B the node-arc matrix R and its powers have been updated accordingly. As can be seen from the value of $R^2$, also illustrated in FIG. 6B, the primary diagonal is now non-zero, and there are two-step cyclic routes starting from threads A and B (from A to B and back again, and conversely from B to A and back again. Looking at $R^3$, there are also three-step cyclic routes starting from threads A (via B and E), B (via C and A) and E (via B and A). (Note that the 2 in $R^3$ from C to B indicates that there are two possible routes here, via A and E, or via B and A). The presence of even a single such cyclic route in one of the powers of R indicates a deadlock problem.

Note that in setting up the dependencies of FIG. 5, for monitor M1 owned by A, and having B and C waiting, we set up three relationships (B waits on A; C waits on B; C waits on A). Since the last one is logically implied by the first two, we could omit it from the above analysis as redundant. However, specifying that C waits on B implies an ordering in the queue (that B is ahead of C). In the formal Java VM definition, there is no such ordering amongst threads waiting to enter a monitor; in other words, any waiting thread may be the first to obtain ownership once the monitor is released by its current owner. In this case the only relationships that we could definitely write down for monitor M1 in the above case are that B waits on A and C waits on A, since the dependency between B and C is currently indeterminate. On the other hand, a particular Java VM implementation may decide to adopt a formal queue model for those threads waiting to enter the monitor (such as FIFO, first in first out). In this case the dependencies corresponding to this queue model can be added to the deadlock analysis, as has effectively been done for FIG. 5.

It will be appreciated that deadlock analysis per se, such as illustrated in FIGS. 5 and 6, is well-known in the prior art, and indeed the skilled person will be aware of other techniques equivalent to those presented in FIGS. 5 and 6. However, the focus of the present invention lies in the application of the deadlock analysis as a run-time facility, compared to the prior art use of deadlock detection primarily as part of the design process or for debugging purposes.

Figure 7:
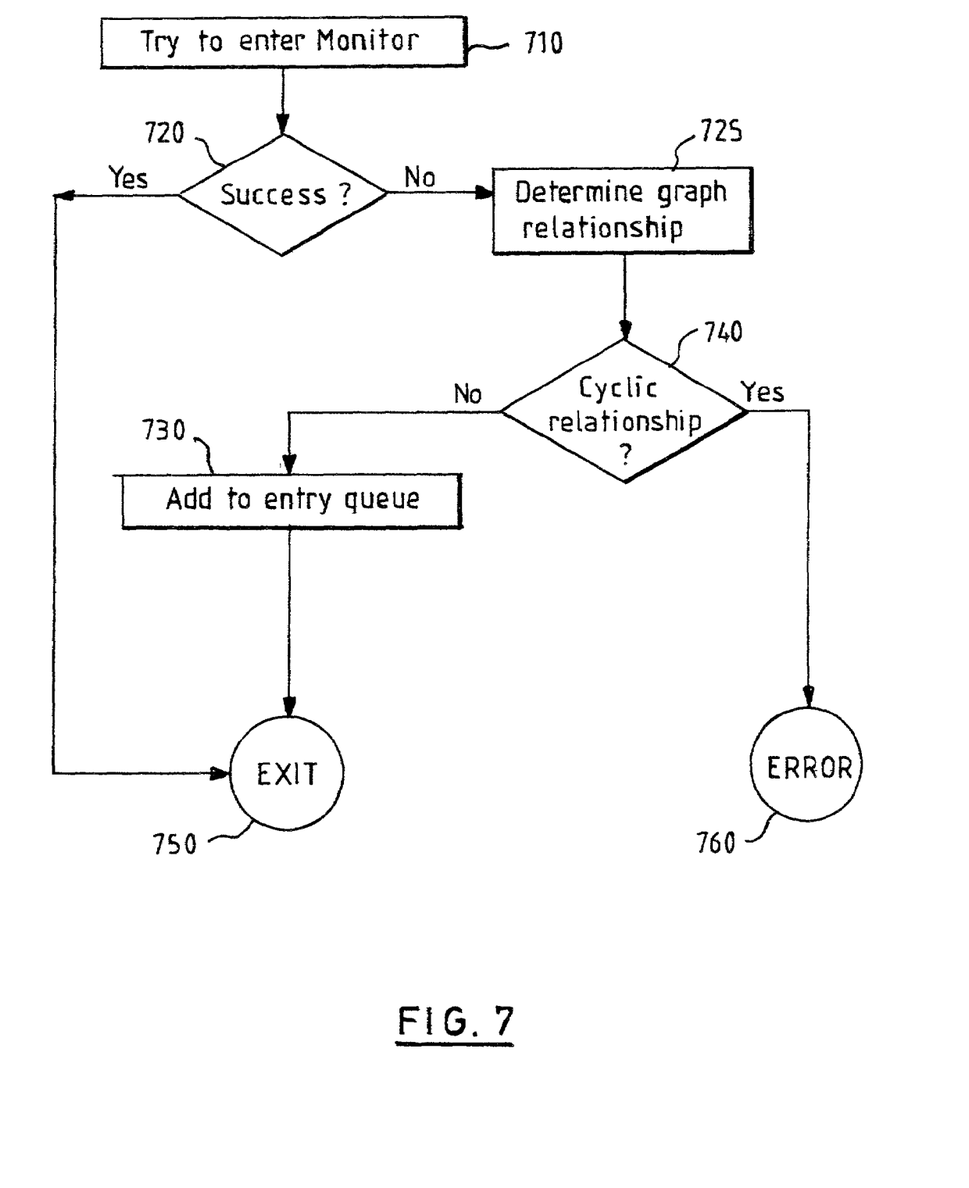
FIG. 7 is a flowchart of the steps taken to detect deadlock on entering a monitor.

This is illustrated in the method of FIG. 7, which starts with an attempt to enter a monitor (step 710), corresponding for example to step 305 or 350 in FIG. 3. If this attempt is successful (step 720), in other words if the monitor is available, we can exit (step 750). This is because a new deadlock situation can only arise when a thread needs to wait (queue). On the other hand, if the monitor is already owned by another thread, then there is contention for the monitor, and the attempt to enter it will be unsuccessful. In this case the standard procedure is to simply add the thread to the monitor entry queue (as shown in step 355, FIG. 3). However, in accordance with a preferred embodiment of the present invention, prior to doing this a check is made for potential deadlock. This involves determining the graph of threads queued on monitors (step 725), and looking for any cyclic relationships (step 740). If none are found, then the requesting thread can indeed be added to the entry queue (step 730), and the method can exit. On the other hand, if a cyclic relationship is found, then this indicates a deadlock problem, and so the method exits with error (step 760). This last eventuality is discussed in more detail below.

The determination of the graph for queued threads can be performed essentially as described in relation to FIGS. 5 and 6. Thus at step 725 all the monitors are scanned to identify those having threads in their entry queues (those monitors that are not owned or are owned but without any queuing threads can be ignored). For each of the identified monitors, the corresponding graph relationships are then determined. Finally, a search is made for cyclic links, using the node-arc matrix technique described above, or any other suitable technique (it will be appreciated that a variety of mechanisms are available in the art to uncover a cyclic chain of dependencies).

Figure 8:
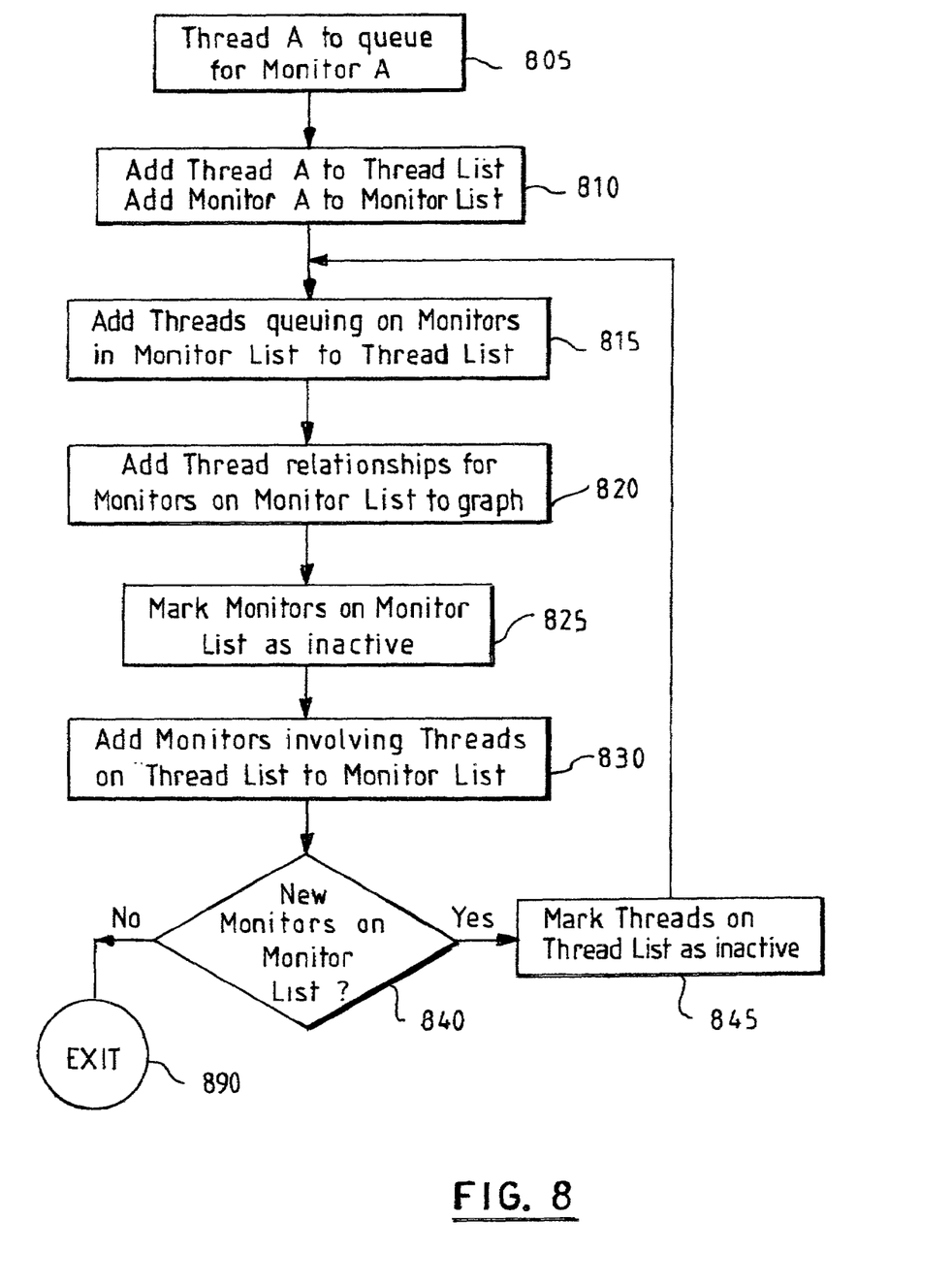
FIG. 8 is a flowchart of the steps used to construct the graph for detecting deadlock in one preferred embodiment of the invention.

In an alternative embodiment, rather than scanning all monitors to derive the thread waiting graph, a more targeted approach is adopted to focus on those particular threads and monitors which may lead to deadlock for any given monitor operation. This is illustrated in FIG. 8. The method starts with thread A queuing to enter monitor A (step 805). Thread A and Monitor A are then added to a thread list and a monitor list respectively (step 810), which are both initially assumed to be empty. Next, any other threads queuing on monitors in the monitor list are added to the thread list (step 815). Note that the currently owning thread of a monitor would be considered as part of the queue, and added also here, with the exception that we can ignore monitors that are owned but that do not have any queue of other threads waiting to enter them (in other words, we are only interested in contended monitors). At this initial stage, only monitor A is in the monitor list, and so the thread list now simply contains those threads queuing for (or owning) monitor A. Note that any individual thread is added just once to the thread list, even if it arises multiple times, for example because it owns various objects. The various thread relationships for monitors on the monitor list are then added to the graph, i.e. as shown in FIGS. 5 and 6, (step 820).

The monitors on the monitor list are now marked as inactive (step 825). The purpose of retaining inactive monitors on the monitor list is simply to be able to identify any new monitors that have not been previously processed, as described below; otherwise the inactive monitors are ignored. Next, monitors involving threads on the thread list are added to the monitor list (step 830). In this context, a monitor involves a thread if that monitor has a queue of threads waiting to enter it (i.e. there is contention for the monitor), and the thread is either waiting in the queue or the current owner of the monitor. Only new (active) monitors are added to the list —monitors which have previously been investigated and are on the list but marked as inactive are discounted.

A test (step 840) is now performed to see if any new monitors have indeed been added to the list; if not, then processing is complete, and the method exits (step 890). On the other hand, if the test of step 840 is positive, the existing threads on the thread list are marked as inactive, and the method returns to step 815. The purpose of marking threads as inactive is basically the same as marking monitors as inactive, i.e. to keep track of threads that have already been processed, but they are otherwise ignored, in particular at step 830. Thus in step 815, only those threads that have not already been processed are added to the thread list, whilst threads which have previously been processed will be on the list, but marked as inactive.

The overall result of the process of FIG. 8 is to iteratively identify all threads and monitors associated with Thread A and Monitor A, in the sense that they might produce a deadlock situation. Once the processing of FIG. 8 has been completed, the graph created can the be examined for cyclic links, as previously described in relation to FIGS. 5 and 6.

Conceptually the above processing builds up a chain of waiting threads→monitors→holding threads→waiting threads→monitors→holding threads, etc. (N.B. here waiting represents queuing to enter the monitor rather than waiting for a notify call). The first waiting thread in the chain is the requesting thread that wants to enter a contended monitor (the first monitor in the chain), which is currently owned by the first holding thread in the chain. From here we identify any monitors where the first holding thread is waiting, and look at the holding threads for those monitors. This process then continues iteratively by identifying the monitors where the holding threads are waiting etc., until no new threads/monitors are added to the chain. At this point, a cyclic dependency (and hence deadlock) can be detected if the requesting thread is present elsewhere in the chain.

Although it clearly takes a certain amount of time to perform the processing of FIG. 8, there is no danger that lack of simultaneity will produce incorrect results. Thus it is possible that during the processing of FIG. 8 certain monitor operations will be performed, but these will not impact the outcome of the deadlock analysis. The reason for this is that if the addition of Thread A to the entry queue of Monitor A will lead to a deadlock, for example involving threads A, B, C and D, then at this point the other threads (B, C, and D) must already be suspended, otherwise queuing thread A could not produce the deadlock. Therefore if any monitor operations are happening in parallel with the analysis of FIG. 8, these cannot involve threads B, C, and D, and so will not affect the detection of the deadlock. Note that if the processing of FIG. 8 is performed simultaneously in relation to different monitor operations, e.g. Thread A wanting to enter Monitor A, and Thread B wanting to enter Monitor B, then in the deadlock analysis for Thread A/Monitor A it will have to be assumed that Thread B is already waiting on Monitor B, and vice versa.

The skilled person will be aware of many possible variations on the method of FIG. 8. For example, rather than marking items as inactive, threads and/or monitors that have already been processed could be stored in a separate listing. In addition, the search for cyclic links could be performed as each new set of relationships is added to the graph (step 820), thereby saving iterations if a deadlock is quickly found.

A rather different approach from FIG. 8 is to maintain a global graph of the status of all waiting threads and monitors. This would then be updated by each new entry or exit from a monitor queue. This may be more efficient than creating the graph afresh for each monitor queue entry.

There are also various options as regards the timing of when the deadlock analysis is performed. In one embodiment, this analysis is performed each time a thread tries unsuccessfully to enter a monitor (corresponding to the negative outcome from step 720 in FIG. 7). In situations where the entry queue order is indeterminate (i.e. if threads B and C are both waiting to enter a monitor, and there is no certainty which one will acquire if first) a new dependency is created each time the monitor is released and then entered by a queuing thread. Thus in the above example, if the monitor is released by its current owner and acquired by B, then we have a new dependency of C on B; conversely if C now acquires the monitor, we have a new dependency of B on C. However, this cannot of itself lead to deadlock, since the acquiring thread (which can only have been waiting on this one monitor) must now be free to proceed.

The above approach represents a relatively significant overhead in terms of the processing of contended monitors (although in practice the great majority of monitor operations are uncontended). In another preferred embodiment therefore a rather different approach is taken. This involves providing a special system status thread which periodically (e.g. every second) looks at the progress of the different threads according to their program counters. If a set of threads appear to have stopped, so that their program counters have not changed between successive cycles of the status thread, this may be an indication of deadlock. The status thread can then seek to confirm this by performing the deadlock analysis (described above in connection with FIGS. 5 and 6) in relation to all of the stopped threads, and the monitors which they own or are queued for. This deadlock analysis may optionally be preceded by a check that the suspended threads are indeed all involved in monitor operations, rather than the delay being caused by some other (intended) programming circumstance.

An important aspect not yet discussed is what action the system should take if a deadlock is located, i.e. the thread graph is cyclic, as per step 760 in FIG. 7. In the simplest implementation, the system simply returns an error condition, which results in termination of the application. This error condition can be accompanied by various diagnostic information resulting from the deadlock analysis, in particular the identities of the threads and monitors involved in the deadlock, plus any other useful information, such as the object class for the relevant synchronised method that caused the deadlocking monitor operation. This represents a significant improvement on the current typical behaviour, which is for a system to enter an arbitrary wait at deadlock until the user terminates the program by hand.

In the preferred embodiment, the system throws an exception rather than an error when a deadlock is detected. The exception includes the same diagnostics as supplied with the error condition discussed above (i.e. the identities of the relevant monitors and threads, etc.). For the Java platform, this exception is classified as a run-time error, so that applications do not necessarily have to specifically deal with it (if they do not recognise it, then it gets eventually directed to the standard output). On the other hand, it is possible to write an exception handler for the application that responds to the deadlock detection.

There are several measures that the application could try to take to resolve the deadlock. The simplest is for the requesting thread that triggered the deadlock to examine the resources that it already owns, and release some to obviate the deadlock. This therefore provides the possibility not only of deadlock detection, but also deadlock avoidance. Note that if the requesting thread releases its complete set of resources, then logically this must break the deadlock cycle (since now there can be no thread with a dependency on the requesting thread).

In theory the application could also try to release unwanted resources from threads that have already been suspended, although this depends on the language permitting the application to release such resources on behalf of the suspended threads. An alternative approach therefore is for the system to belatedly raise exceptions for these other suspended threads (as if they were just about to queue on the monitor). This delayed exception is permissible, in principle at least, since the suspended threads have not progressed since entering the monitor queue, and so in logical terms are still at the point where the exception can be raised.

If the above actions do not resolve the deadlock, the application then must decide how to continue. It may select to allow existing (non-suspended threads) to continue their processing, and then to terminate itself in an orderly fashion without resolving the deadlock. Alternatively, it could take more drastic action to break the deadlock, such as selecting one or more threads to kill, thereby freeing up the resources owned by this thread (or threads). The selection of the thread(s) can be made according to various criteria, such as priority, closeness to completion, the number of resources owned, or some other application-dependent consideration(s). Whether killing a thread is a satisfactory option to allow processing to continue or whether it would be better to abort the entire program will depend on the specific application. For example, in a transaction processing environment, which uses commit protocols to ensure proper completion of a transaction, killing a thread may be followed by backing out and then restart of the relevant transaction, without any great detriment.

The above responses to deadlock can be readily applied to the embodiment described above where deadlock is not detected in real-time for each contended monitor operation, but only in response to a system status thread observing that a set of threads are suspended. For example, exceptions could be raised for the suspended threads, allowing them to back out of the monitor operation and release resources, and thereby hopefully eliminating the deadlock.

The deadlock detection and avoidance approach described above is particularly suited for simple synchronisation in Java as used to enforce exclusive access to a particular resource (as illustrated in FIG. 3). In this context, the investigation for possible deadlock may be performed at any attempt to enter the monitor, corresponding to steps 305 and 350 in FIG. 3, and also to steps 405 and 450 in FIG. 4 (leading to wait-notify). Thus in one embodiment the processing of FIGS. 7 and 8 is incorporated into the monitor enter routine of the Java VM.

One complication here concerns the re-entry of a thread into the monitor once it has been notified (corresponding to step 435 in FIG. 4). It must be remembered that this step of re-entering the monitor is transparent as far as the application is concerned; in other words, the application is not formally aware that the monitor was exited at step 425 and now has to be reacquired. This makes throwing an exception here rather problematic. Accordingly, any deadlock handling routine associated with monitor entry needs to be able to distinguish the situation corresponding to step 435, and alter its behaviour appropriately. One possibility with respect to the monitor entry of step 435 is for the system to generate an error (rather than an exception), indicating that a deadlock situation has occurred.

This leads on more generally to the use of deadlock analysis in relation to the Java wait-notify construct. If the initiation of a wait-notify condition results in deadlock, this will be detected as described above in relation to monitor entry operations, because wait-notify always commences with such a monitor entry (step 405 in FIG. 4). However, the analysis discussed so far does not make any allowance for threads that are waiting on a monitor, rather than queuing to enter it (i.e. between steps 425 and 435 in FIG. 4), despite the fact that such a wait condition may in itself contribute to deadlock. As an example, Thread A may own Monitor A, and go into a wait on Monitor B. Now if Thread B comes along, enters Monitor B (for some purpose other than notifying Thread A), and then tries to enter Monitor A (still owned by Thread A), a deadlock situation has resulted.

In fact, the deadlock analysis described above can be extended relatively easily to include waiting threads on the following basis:

(i) a waiting thread is dependent on the thread (if any) that currently owns the monitor, since it cannot progress until the owning thread releases the monitor;

(ii) a waiting thread is potentially dependent on any threads that are currently queued to enter the monitor, if an ordered queuing model is used (e.g. a FIFO model for the monitor entry queue); on the other hand, if the order of the monitor entry queue is indeterminate, then there is no such dependency, since the waiting thread may be notified at any time, join the monitor entry queue, and then be the first to acquire the monitor when released by its current owner;

(iii) a waiting thread is not dependent on any other threads that are waiting on the monitor. This is because there is no ordering imposed on multiple waiting threads; in other words, if there is a notify-all call, the thread that obtains ownership of the monitor will be the one that first responds with an attempt to enter the monitor.

Thus if a monitor is currently owned by thread A, has threads B and C queued to enter the monitor, and has threads D and E waiting on the monitor for notification, then thread E is dependent on thread A, potentially dependent on threads B and C (if an ordered entry queue is utilised), but not D. (In this context, dependency implies a directed relationship such as illustrated in FIGS. 5 and 6, wherein a first thread cannot progress until a second thread releases a resource). The dependencies derived above can be simply added to graphs such as in FIGS. 5 and 6, and thereby included in the analysis to look for deadlock.

There are however two complications in extending the deadlock analysis to include waiting threads. The first is that the Java language allows a specific interrupt to remove a thread from its Wait condition, without being formally notified. Thus a situation which may appear deadlocked may in fact be recoverable, if the application uses this particular approach (although it is not generally considered good programming practice).

The second complication concerns the extent to which the system can detect deadlock involving waiting threads, i.e. those threads which have made a Wait call on a resource, and are now suspended pending receipt of a Notify call. The problem here is that the system has no way of knowing which thread will Notify a waiting thread, and so cannot construct a full dependency graph. Consider for example if Thread A owns resource A, and then Waits on resource B. Meanwhile, if Thread B is trying to acquire resource A before performing a Notify in relation to Thread A on resource B, then a deadlock has occurred. However, the system cannot detect this deadlock because it does not know that the application is expecting Thread B to notify Thread A rather than some other thread which is still in progress. In particular, the system is only able to detect the dependency of a waiting thread on the current owner of the relevant monitor; it cannot detect the dependency of the waiting thread on an intended notifying thread. (It may in principle be possible to scan various future thread operations for a forthcoming notify operation, but the complexity here is very high).

This leaves two main options for the treatment of deadlock detection and waiting threads:

(a) ignore waiting threads altogether in the construction of the dependency chains so that no deadlocks involving threads waiting to be notified are detected.

(b) include waiting threads in deadlock analysis where the monitor being waited on has a current owner which is not the waiting thread.

The former option is somewhat simpler, providing complete coverage across a predetermined set of operations (monitor entry). The latter option will detect a broader range of possible deadlocks, including some involving wait-notify conditions, but with certain restrictions. Thus firstly, not all deadlocks including wait-notify conditions can be detected, and secondly, deadlocks may be detected which would have been resolved by an interrupt operation.

Which option is selected is a matter of design choice, and indeed may be offered as a user setting. Thus for example, some users may want to include waiting threads in the deadlock analysis to provide the maximum possible scope of detection. Alternatively, others may want to exclude such waiting threads, particularly if they have used interrupts that interact with waiting threads. Moreover, since the Wait-Notify construct automatically involves waiting (unlike standard synchronisation operations for exclusive access), the possibility of deadlock will be more apparent to a user in this situation, and any problems should be easier to detect manually.

The same set of remedies discussed above in response to detection of deadlock can be employed where waiting threads have been included in the deadlock analysis. In fact, the options open to an application to try to resolve deadlock are increased by the presence of a waiting thread in the deadlock cycle, since it can utilise the appropriate interrupt to remove it from its wait condition. (On the other hand simply notifying the waiting thread will not resolve the deadlock, because it still could not obtain ownership of the relevant monitor in order to continue processing).

In one preferred embodiment, the deadlock detection facility of the present invention is provided as a run-time option, in other words, it can be turned off and on by the user. The reason for this is that clearly the processing to detect deadlock has some impact on overall system performance, which may not be desirable in a production environment. Consequently it may be preferable to limit use of the deadlock detection facility to program testing and debugging operations, for a programmer to deploy if a particular deadlock problem is encountered or suspected. On the other hand, it may sometimes be desirable to maintain the deadlock detection facility even in a production environment, for example for applications where reliability is more important than absolute speed.

Note that the use of the system status thread described above to detect deadlock once it has occurred, rather than for each contended monitor entry, will have the least impact on the performance of the application. One reason that this is potentially important is that whether or not the deadlock detection facility is utilised will affect program timing, and this in turn may impact the occurrence of deadlock in the first place. In this context it is contemplated that the system also supports a feature which will essentially randomise program timing, for example by introducing small delays at various points. Running the program many times in slightly different circumstances will give a good idea as to how vulnerable it is to deadlock.

Other parameters which may be made subject to user control include the response to the detection of deadlock (whether to raise an exception just for the triggering thread, or for all the suspended threads), and also the timing of the deadlock analysis (e.g. whether only to perform this only in the event that certain threads appear to have stopped progress). Another option is to exclude the deadlock detection facility of the present invention if the JIT compiler is being used. The reason for this is that it is relatively easy to update the software forming the virtual machine, in particular the monitor operations, in order to implement the deadlock detection facility, but more complex to make these modifications at a binary level. This limitation is not too serious, since as mentioned above the facility is unlikely to be used where speed is of the essence (which is where a JIT is most usually employed).

The invention has been described primarily in the context of the Java environment. One reason for this is that Java programs are normally interpreted, and so the behaviour of the virtual machine can be modified relatively easily as described above. Nevertheless, it will be appreciated that any system that supports parallel processes could potentially benefit from the approach of the invention. Note that in this context parallel processes represent any separate strands of execution, whether threads, processes, or any other similar construct, that occur logically at the same time, irrespective of whether the system is truly parallel (e.g. multiprocessor), or simulates this by time-slicing. It will also be appreciated that the system may not necessarily be limited to a single machine, but could comprise a distributed system, providing the necessary process information is available to be able to identify loops. For example, an application on one Java VM may use Remote Method Invocation (RMI) to call code on a remote machine, which may in turn take ownership of a resource. Providing a mechanism is put in place for allowing Java VMs to exchange monitor information (or at least thread dependency information), then a deadlock can be detected in such circumstances, even if it spans two or more machines.

What is claimed is:

1. A computer implemented method in a virtual machine layer of a computer system supporting multiple processes, said method including the steps of:

utilizing a set of monitors for controlling access to resources of the computer system, whereby a given process has to enter a given monitor in order to access a corresponding given resource, and has to join an entry queue for the given monitor if the given resource is currently owned by another process for which the given process has entered;

responsive to a predetermined condition of a requesting process requesting to enter a requested monitor, from the set of monitors, currently owned by a different process, examining queued processes queued on at least one of the set of monitors to determine whether there is a deadlock situation by detecting a cyclic dependency at a time a given dependency is created, wherein the examination of queued processes queued on the at least one of the set of monitors to determine whether there is the deadlock situation includes those processes having a conditional wait on at least one of the set of monitors; and if the deadlock situation is found, returning information about an identity of i) identified processes from the examined queued processes, and ii) identified monitors from the set of monitors, involved in the deadlock situation with an exception returned to an application while the application is running on the virtual machine layer of the computer system thereby enabling the application to resolve the deadlock situation by having at least one of the identified processes release at least one of the identified monitors that the at least one identified process owns but is not currently using for continued processing by the application without the deadlock situation.

2. The computer implemented method of claim 1, wherein the examined queued processes involved in said examining step are determined iteratively based on at least one of the multiple processes queued on the requested monitor, and at least one of the multiple processes queued on other monitors owned by examined queued processes already determined to be involved in said examining step.

3. The computer implemented method of claim 1, wherein the system maintains a global table of contended monitors, a given one of the contended monitors being contended if there is a given queued process in its entry queue, the table further identifying those processes which own or are queued on contended monitors.

4. The computer implemented method of claim 1, wherein said exception is returned to the requesting process.

5. The computer implemented method of claim 1, wherein the exception is returned to all identified processes involved in the deadlock situation.

6. The computer implemented method of claim 1, wherein the examination of queued processes queued on at least one of the set of monitors includes those monitors on at least one remote machine.

7. A computer system having a virtual machine layer between applications executing on the computer system and an operating system of the computer system, the computer system having means for supporting multiple processes, the computer system comprising:

a set of monitors for controlling access to a plurality of resources of the computer system, whereby a given process has to enter a given monitor in order to access a corresponding given resource;

an entry queue for the each given monitor if the corresponding given resource is currently owned by another process for which the given process has entered;

means, within the virtual machine layer of the computer system, responsive to a predetermined condition of a requesting process requesting to enter a requested monitor, from the set of monitors, currently owned by a different process for examining queued processes queued on at least one of the set of monitors to determine whether there is a deadlock situation by detecting a cyclic dependency at a time a given dependency is created, wherein the examination of queued processes queued on the at least one of the set of monitors to determine whether there is the deadlock situation includes those processes having a conditional wait on at least one of the set of monitors; and means, responsive to the deadlock situation being found, for returning information about an identity of the i) identified processes from the examined queued processes, and ii) identified monitors the set of monitors, involved in the deadlock situation with an exception returned to a given one of the given applications while the given application is running on the virtual machine layer of the computer system thereby enabling the given application to resolve the deadlock situation by having at least one of the identified processes release at least one of the identified monitors that the at least one identified process owns but is not currently using for continued processing by the application without the deadlock situation.

8. The system of claim 7, wherein the examined queued processes to be examined are determined iteratively based on at least one of the multiple processes queued on the requested monitor, and at least one of the multiple processes queued on other monitors owned by examined queued processes already determined to be examined.

9. The system of claim 7, wherein the system maintains a global table of contended monitors, a given one of the contended monitors being contended if there is a given queued process in its entry queue, the table further identifying those processes which own or are queued on contended monitors.

10. The system of claim 7, wherein said exception is returned to the requesting process.

11. The system of claim 7, wherein the exception is returned to all identified processes involved in the deadlock situation.

12. The system of claim 7, wherein the examination of queued processes queued on at least one of the set of monitors includes those monitors on at least one remote machine.

13. A computer program product comprising program instructions encoded in machine readable firm on a medium, said instructions when loaded into a computer system, having means to support multiple processes, causing a virtual machine layer of the computer system to perform the steps of:

utilizing a set of monitors for controlling access to resources of the computer system, whereby a given process has to enter a given monitor in order to access a corresponding given resource, and has to join an entry queue for the given monitor if the given resource is currently owned by another process for which the given process has entered;

responsive to a predetermined condition of a requesting process requesting to enter a requested monitor, from the set of monitors, currently owned by a different process, examining queued processes queued on at least one of the set of monitors to determine whether there is a deadlock situation by detecting a cyclic dependency at a time a given dependency is created; and if the deadlock situation is found, returning information about an identity of i) identified processes from the examined queued processes, and ii) identified monitors from the set of monitors, involved in the deadlock situation with an exception returned to an application while the application is running on the virtual machine layer of the computer system thereby enabling the application to resolve the deadlock situation by having at least one of the identified processes release at least one of the identified monitors that the at least one identified process owns but is not currently using for continued processing by the application without the deadlock situation.

14. The computer program product of claim 13, wherein the examined queued processes involved in said examining step are determined iteratively based on at least one of the multiple processes queued on the requested monitor, and at least one of the multiple processes queued on other monitors owned by examined queued processes already determined to be involved in said examining step.

15. The computer program product of claim 13, wherein the system maintains a global table of contended monitors, a given one of the contended monitors being contended if there is a given queued process in its entry queue, the table further identifiying those processes which own or are queued on contended monitors.

16. The computer program product of claim 13, wherein said exception is returned to the requesting process.

17. The computer program product of claim 13, wherein the exception is returned to all identified processes involved in the deadlock situation.

18. The computer program product of claim 13, wherein the examination of queued processes queued on at least one of the set of monitors includes those monitors on at least one remote machine.

* * * * *